US007684353B2

(12) United States Patent
Fujimori

(10) Patent No.: US 7,684,353 B2
(45) Date of Patent: Mar. 23, 2010

(54) METHOD AND APPARATUS FOR MANAGING TRANSMISSION AND RECEPTION OF DATA OVER A NETWORK

(75) Inventor: Junichi Fujimori, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 309 days.

(21) Appl. No.: 11/715,582

(22) Filed: Mar. 7, 2007

(65) Prior Publication Data

US 2007/0160044 A1 Jul. 12, 2007

Related U.S. Application Data

(62) Division of application No. 10/027,847, filed on Dec. 21, 2001, now Pat. No. 7,224,690.

(30) Foreign Application Priority Data

Dec. 25, 2000 (JP) ............................ 2000-393188

(51) Int. Cl.
*H04L 12/28* (2006.01)
*G10H 1/10* (2006.01)

(52) U.S. Cl. ........................ 370/255; 370/389; 370/236

(58) Field of Classification Search ................. 370/254, 370/255, 389, 390, 429, 432, 222, 252, 453, 370/236; 84/653, 660, 667; 700/94
See application file for complete search history.

(56) References Cited

U.S. PATENT DOCUMENTS 5,616,879 A 4/1997 Yamauchi et al.
5,825,752 A 10/1998 Fujimori et al.
5,831,192 A 11/1998 Watari et al.
5,867,497 A * 2/1999 Fujimori et al. ............. 370/384

(Continued)

FOREIGN PATENT DOCUMENTS

EP 281 214 A2 9/1988

(Continued)

OTHER PUBLICATIONS

European Search Report mailed Jan. 8, 2004, for EP Application No. 01129711.6, four pages.

*Primary Examiner*—Chi H Pham
*Assistant Examiner*—Ahmed Elallam
(74) *Attorney, Agent, or Firm*—Morrison & Foerster LLP

(57) ABSTRACT

In a network which includes at least a transmission-side apparatus having a plurality of logical plugs and a reception-side apparatus having a plurality of logical plugs, correspondence between transmission-side logical plugs (e.g., P2 to P4) and reception-side logical plugs (e.g., P4 to P6) is established. The reception-side apparatus stores therein plug data Splug (P2) representing one of the transmission-side logical plugs, plug data Dplug representing a logical plug corresponding to the plug data Splug, among the plurality of reception-side logical plugs, and connection number Nconn representing the number of logical plugs to be connected. The transmission-side apparatus adds to control data a plug number PluNO (P3) representing the logical plug which has output the control data and transmits the control data. The reception-side apparatus determines whether to receive the control data, on the basis of PluNO, Splug, and Nconn, and specifies a logical plug (P5) which receives the control data, on the basis of PluNO, Splug, and Dplug.

9 Claims, 12 Drawing Sheets

U.S. PATENT DOCUMENTS

| | | | | |
|---|---|---|---|---|
| 5,898,118 | A * | 4/1999 | Tamura | 84/602 |
| 5,995,506 | A | 11/1999 | Fujimori | |
| 6,088,364 | A | 7/2000 | Tokuhiro | |
| 6,182,126 | B1 * | 1/2001 | Nathan et al. | 725/134 |
| 6,404,770 | B1 | 6/2002 | Fujimori et al. | |
| 6,444,890 | B2 | 9/2002 | Kondo et al. | |
| 6,502,000 | B1 | 12/2002 | Arnold et al. | |
| 6,570,081 | B1 * | 5/2003 | Suzuki et al. | 84/622 |
| 6,591,313 | B1 | 7/2003 | Hata et al. | |
| 6,697,886 | B1 * | 2/2004 | Muraki et al. | 710/36 |
| 6,725,311 | B1 | 4/2004 | Joy et al. | |
| 6,757,303 | B1 * | 6/2004 | Kikuchi et al. | 370/509 |
| 6,763,448 | B1 | 7/2004 | Mitsubishi | |
| 6,910,090 | B1 | 6/2005 | Scheel et al. | |
| 6,947,156 | B1 | 9/2005 | Jeyachandran et al. | |
| 6,947,422 | B1 * | 9/2005 | Ichimura et al. | 370/392 |
| 6,961,631 | B1 | 11/2005 | Puryear | |
| 6,993,606 | B1 | 1/2006 | Takaku et al. | |
| 7,051,123 | B1 * | 5/2006 | Baker et al. | 710/22 |
| 7,058,746 | B1 | 6/2006 | Kaibuki | |
| 7,181,299 | B2 * | 2/2007 | Osakabe et al. | 700/94 |
| 7,224,690 | B2 | 5/2007 | Fujimori | |

FOREIGN PATENT DOCUMENTS

| | | |
|---|---|---|
| EP | 762 684 A2 | 3/1997 |
| WO | WO-96/12257 | 4/1996 |

* cited by examiner

TRANSMISSION INFORMATION AREA 32a

METHOD AND APPARATUS FOR MANAGING TRANSMISSION AND RECEPTION OF DATA OVER A NETWORK

CROSS REFERENCE TO RELATED APPLICATION

This application is a division of application Ser. No. 10/027,847 filed on Dec. 21, 2001, the entire contents of which are incorporated herein by reference.

BACKGROUND OF THE INVENTION

1. Field of the Invention

The present invention relates to a network to which a plurality of apparatuses are connected, and more particularly to a method and apparatus for managing transmission and reception of data over the network.

2. Description of the Related Art

In a conventional network including a plurality of apparatuses connected via cables, there has frequently been employed a technique for transferring control data from a first apparatus to a second apparatus in order to operate the second apparatus on the basis of the transferred control data. In such a case, since each of the first and second apparatuses has a plurality of functional modules, managing each set of control data to be transferred requires determination of a functional module of the first apparatus which serves as a source and a functional module of the second apparatus which serves as a destination. For attaining such management, conventionally, virtual terminals (hereinafter referred to as logical plugs) are assumed for a plurality of functional modules of each apparatus; information representing the connection relationship between each logical plug of the first apparatus and a corresponding logical plug of the second apparatus (e.g., information representing plug pairs connected between the apparatuses) is stored in both apparatuses; and through use of this information, control data are transferred from a certain functional module of the first apparatus to a corresponding functional module of the second apparatus.

With recent progress in networking realized through use of high speed communication cables (e.g., “IEEE1394,” “USB,” etc.), an increased number of apparatuses are connected within a network, and each apparatus becomes complex or realizes a large number of functions of different kinds. Therefore, the number of logical plugs increases considerably, raising the problem of a huge increase in the amount of information representing the above-described connection relationship. Further, when an apparatus connected to the network is replaced with another apparatus, time-consuming operation must be performed in order to update the information.

SUMMARY OF THE INVENTION

The present invention was accomplished to solve the above-described problems, and an object thereof is to provide a method and apparatus for managing transmission and reception of data over a network which can reduce the amount of information used for managing transmission and reception of data between apparatuses connected to the network and which can cope with replacement of apparatuses connected to the network without necessity of time-consuming operation.

In order to achieve the above-described object, the present invention provides a method and apparatus for managing transmission and reception of data over a network which includes at least a transmission-side apparatus having a plurality of transmission-side functional modules which individually produce and output a plurality of control data sets; and a reception-side apparatus having a plurality of reception-side functional modules which realize independent functions by use of input control data sets, respectively, wherein a control data set output from a transmission-side functional module and transmitted from the transmission-side apparatus is received by the reception-side apparatus and is input to a reception-side functional module corresponding to the transmission-side functional module. In the method and apparatus, correspondence between at least two transmission-side functional modules among the plurality of transmission-side functional modules and at least two reception-side functional modules among the plurality of reception-side functional modules is established. The reception-side apparatus stores therein first identification data which represent one transmission-side functional module among the plurality of transmission-side functional modules for which correspondence has been established; and second identification data which represent one reception-side functional module among the plurality of reception-side functional modules for which correspondence has been established, the one reception-side functional module receiving a control data set output from the one transmission-side functional module. The transmission-side apparatus adds identification to a control data set output from one transmission-side functional module among the plurality of transmission-side functional modules for which correspondence has been established and transmits the control data set within the network, the identification data representing the one transmission-side functional module. The reception-side apparatus uses the identification data attached to the control data set and the first and second identification data so as to apply a relationship between the first identification data and the identification data attached to the control data set to the second identification data, to thereby specify the one reception-side functional module to which the control data set is to be input.

The correspondence between the at least two transmission-side functional modules and at least two reception-side functional modules is preferably established in such a manner that the transmission-side functional module represented by the first identification data and transmission-side functional modules subsequent thereto are sequentially related to the reception-side functional module represented by the second identification data and reception-side functional modules subsequent thereto, respectively. The transmission-side apparatus and the reception-side apparatus are not limited to apparatuses which constantly transmit or receive control data, and either or both may be an apparatus which alternately serves as a transmission-side apparatus for transmitting control data and a reception-side apparatus for receiving control data. This also holds true in the case of transmission-side and reception-side apparatuses which will be described below.

In the above-described method and apparatus having the above-described feature, the transmission-side apparatus adds to control data set output from one transmission-side functional module identification data representing the one transmission-side functional module and transmits the control data set within the network; and the reception-side apparatus applies to the second identification data a relationship between the first identification data and the identification data attached to the control data set, to thereby specify the one reception-side functional module to which the control data set is to be input. Therefore, the amount of information representing respective connections between the plurality of transmission-side functional modules of the transmission-side apparatus and the plurality of reception-side functional modules of the reception-side apparatus can be reduced. In other words, there can be reduced the amount of information representing respective connections between a plurality of logical plugs corresponding to the plurality of transmission-side functional modules and a plurality of logical plugs corresponding to the plurality of reception-side functional modules. As a result, the amount of information which is transmitted over the network and which represents the connection relationship can be reduced, and the amount of information which is stored in the transmission-side and reception-side apparatuses can be reduced.

A second feature of the present invention is such that the reception-side apparatus stores therein third identification data for specifying the plurality of transmission-side functional modules for which correspondence has been established, while using the relationship with the one transmission-side functional module represented by the first identification data; and the reception-side apparatus determines to receive the control data set if the identification data added to the control data set represent one of transmission-side functional modules specified by the first and third identification data. Notably, since the correspondence between the plurality of reception-side functional modules of the reception-side apparatus and the plurality of transmission-side functional modules of the transmission-side apparatus has been established, the third identification data also specify the plurality of reception-side functional modules for which correspondence has been established, while using the relationship with the one reception-side functional module represented by the second identification data.

In this case, the third identification data preferably represent a number of transmission-side functional modules including the one transmission-side functional module represented by the first identification data and transmission-side functional modules subsequent thereto. For the same reason as described above, the third identification data represent a number of reception-side functional modules including the one reception-side functional module represented by the second identification data and reception-side functional modules subsequent thereto.

According to the second feature, the reception-side apparatus determines to receive the control data set if the identification data added to the control data set represent one of transmission-side functional modules specified by the first and third identification data. By virtue of this feature, in addition to the effect attributable to the above-described feature, there can be attained an effect such that control data transmitted from the transmission-side apparatus to the reception-side apparatus can be specified more exactly.

A third feature of the present invention is such that the reception-side apparatus stores fourth identification data consisting of at least one type of data selected from among type data representing a type of the control data set to be transmitted, apparatus type data representing a type of the transmission-side apparatus, and apparatus data representing the transmission-side apparatus; the transmission-side apparatus adds the fourth identification data to the control data set output from the one transmission-side functional module among the at least two transmission-side functional modules for which correspondence has been established; and the reception-side apparatus specifies the control data set to be received, on the basis of the fourth identification data added to the control data set.

According to the third feature, when the transmission-side apparatus transmits the control data set after adding thereto the fourth identification data consisting of at least one type of data selected from among type data, apparatus type data, and apparatus data, the reception-side apparatus specifies the control data set which is to be received, on the basis of the fourth identification data attached to the control data set. By virtue of this feature as well, in addition to the effect attributable to the above-described feature, there can be attained an effect such that control data transmitted from the transmission-side apparatus to the reception-side apparatus can be specified more exactly.

A fourth feature of the present invention resides in a method for managing transmission and reception of data over a network composed of a plurality of apparatuses including transmission-side and reception-side apparatuses, in which each reception-side apparatus stores reception identification data for specifying a control data set to be received among control data sets transmitted from transmission-side apparatuses; and by use of the reception identification data, the reception-side apparatus determines whether a control data set transmitted from a transmission-side apparatus is to be received. The method comprises a first step of detecting, when a first transmission-side apparatus is to be replaced with a second transmission-side apparatus, a reception-side apparatus having received the control data set transmitted from the first transmission-side apparatus; and a second step of causing the detected reception-side apparatus to receive a control data set transmitted from the second transmission-side apparatus in place of the control data set transmitted from the first transmission-side apparatus.

In this case, an instruction is preferably imparted to the detected reception-side apparatus, the instruction requesting the detected reception-side apparatus to receive a control data set transmitted from the second transmission-side apparatus in place of the control data set transmitted from the first transmission-side apparatus. When this instruction is used, the detected reception-side apparatus is desirably instructed to replace reception identification data dedicated for the first transmission-side apparatus stored in the reception-side apparatus with reception identification data dedicated for the second transmission-side apparatus.

In this case, preferably, each of the transmission-side apparatuses transmits a control data set after adding thereto transmission identification data for identifying the control data set; and the above-described first step includes the sub steps of obtaining the transmission identification data from the first transmission-side apparatus, transmitting the obtained transmission identification data to the reception-side apparatuses within the network, and inquiring whether the control data set transmitted from the first transmission-side apparatus have been received, to thereby detect a reception-side apparatus having received the control data set transmitted from the first transmission-side apparatus.

The transmission identification data preferably consist of at least one type of data selected from among type data representing a type of the control data set to be transmitted, apparatus type data representing a type of the transmission-side apparatus, and apparatus data representing the transmission-side apparatus.

The fourth feature simplifies the operation which must be performed when a first transmission-side apparatus is replaced with a second transmission-side apparatus, even when a large number of reception-side apparatuses have received a control data set transmitted from the first transmission-side apparatus. As a result, the operation involved in replacement of apparatuses connected to the network can be simplified.

DESCRIPTION OF THE PREFERRED EMBODIMENT

Figure 1:
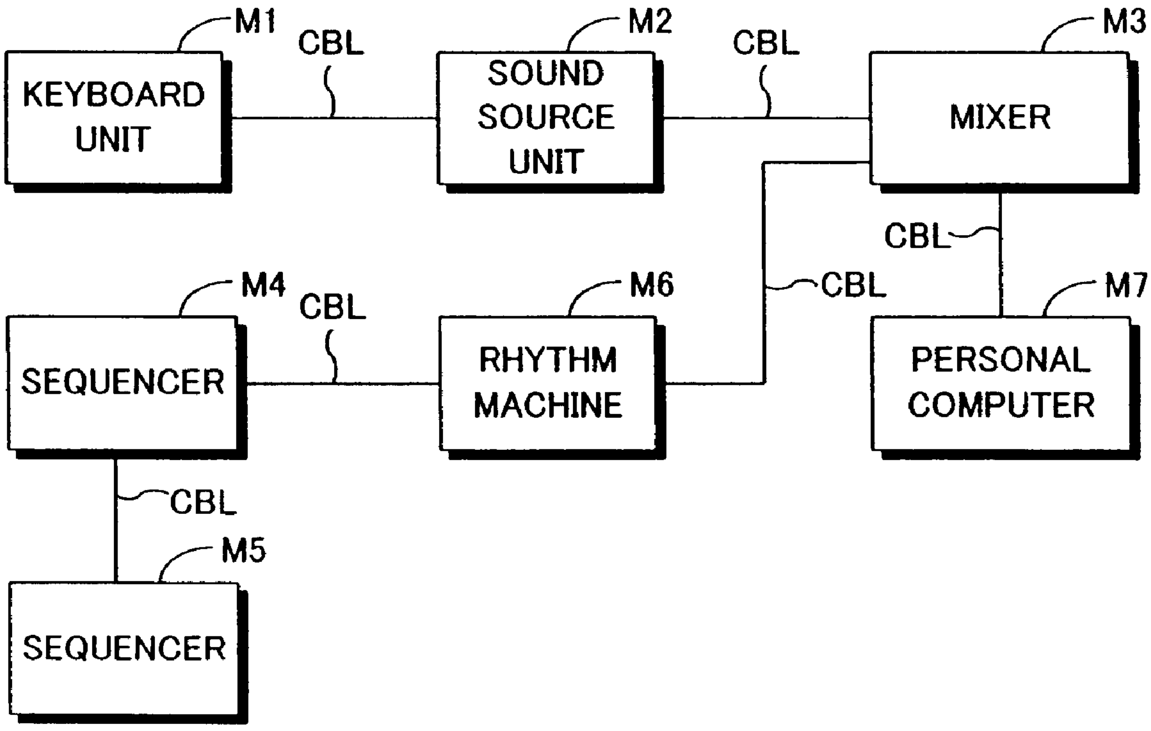
FIG. 1 is a schematic diagram showing an example network according to an embodiment of the present invention.

An embodiment of the present invention will now be described with reference to the drawings. FIG. 1 shows an example network.

The network shown in FIG. 1 consists of various musical production apparatuses (hereinafter called "musical apparatuses") M1 to M7 and high-speed, bi-directional cables CBL (e.g., cables for "IEEE1394" or "USB") connected between the musical apparatuses M1 to M7. Examples of the musical apparatuses M1 to M7 include a keyboard unit, a sound source unit, a mixer, a sequencer, a rhythm machine, a music synthesizer, and a personal computer. Through the cables CBL, the musical apparatuses M1 to M7 exchange various types of data such as musical-sound control data (or MIDI data) for controlling generation, tone pitch, tone color, and tone volume of musical sound, and musical-sound data which represent a musical-sound waveform. Notably, as will be described later, the respective cables CBL are electrically connected together so as to form a common connection line, on which a plurality of different data sets are not present simultaneously. However, data can be transferred not only between two apparatuses connected together via a single cable CBL but also between two apparatuses connected together via another apparatus and a plurality of cables CBL. For example, data can be transferred from the musical apparatus M1 to the musical apparatus M7 via a cable CBL, the musical apparatus M2, another cable CBL, the musical apparatus M3, and another cable CBL; and data can be transferred from the musical apparatus M4 to the musical apparatus M3 via a cable CBL, the musical apparatus M6, and another cable CBL.

Figure 2:
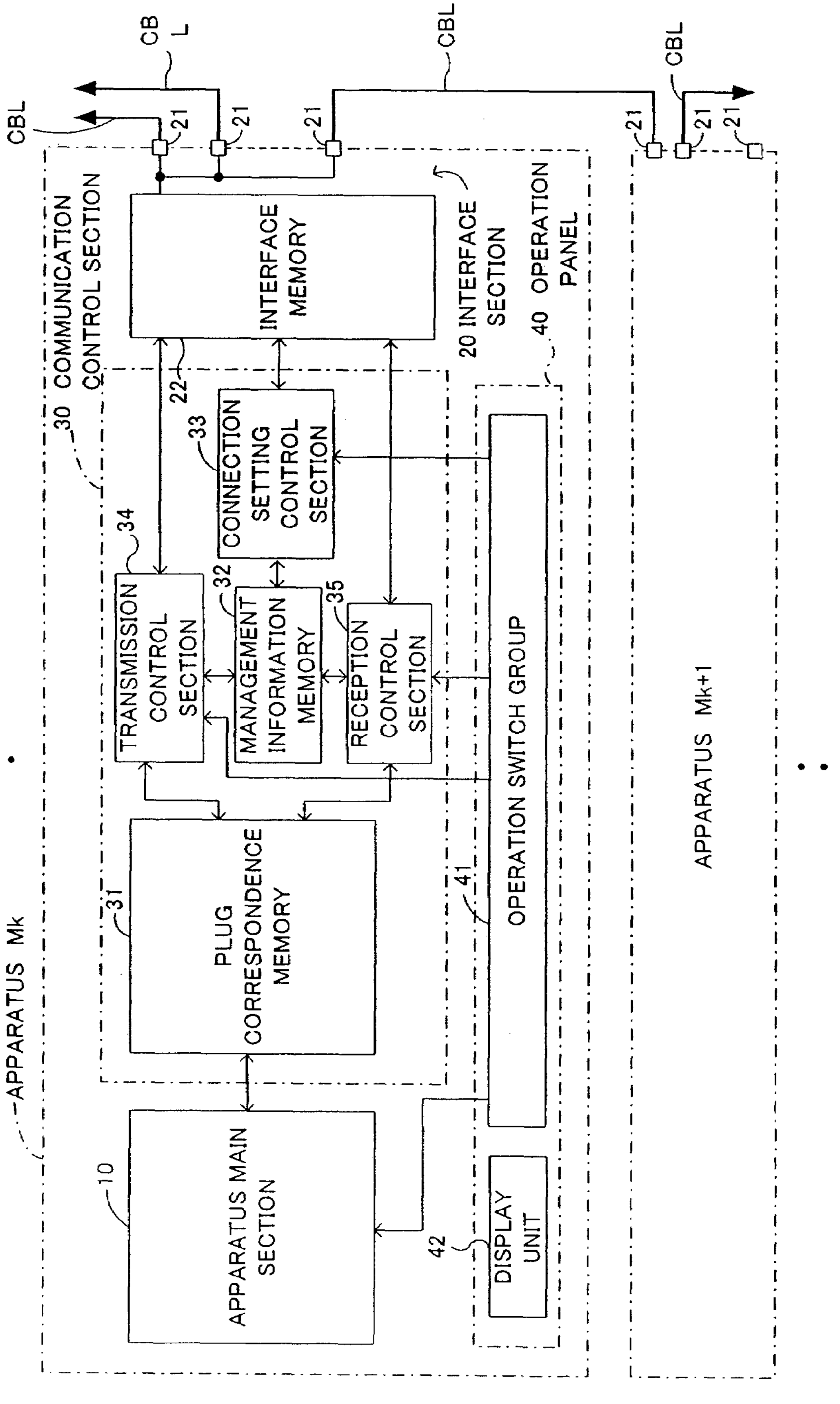
FIG. 2 is a block diagram showing the internal configuration of each of the apparatuses shown in FIG. 1.

As shown in FIG. 2, each musical apparatus Mk includes an apparatus main section 10, an interface section 20, and a communication control section 30 connected between the apparatus main section 10 and the interface section 20.

The apparatus main section 10 includes a plurality of functional modules, each functional module realizing a corresponding function with or without use of input data. The functional modules realize the above-described various functions and output individually corresponding data sets.

For example, in the case in which the musical apparatus Mk is a keyboard unit having a plurality of keys and operating elements (e.g., wheels) for controlling sound effect, the apparatus main section 10 includes a first functional module consisting of the plurality of keys, an operated-key detection circuit, and other elements and adapted to output key data representing the state (i.e., depressed or released state) of each key; and a second functional module consisting of the plurality of operating elements for controlling sound effects and a detection circuit for detecting operated states of the operating elements and adapted to output data representing the operated states of the operating elements. In the case in which the musical apparatus Mk is a sound source unit for generating a plurality of musical sound signals, the apparatus main section 10 includes, as a plurality of functional modules, a plurality of musical sound signal forming channels for individually outputting data sets which represent, respectively, a plurality of musical sound signals of different kinds, such as a melody sound signal, an accompaniment sound signal, and a rhythm sound signal. In the case in which the musical apparatus Mk is a mixer which imparts various effects to musical sound signals and mixes the musical sound signals having undergone various effects, the apparatus main section 10 includes, as a plurality of functional modules, a plurality of effect circuits for imparting different musical effects to a plurality of musical sound signals of different kinds, and a mixing circuit for mixing the plurality of musical sound signals. In the case in which the musical apparatus Mk is a sequencer which automatically outputs at a predetermined tempo control data used for generation of a plurality of musical sound signals, the apparatus main section 10 includes, as a plurality of functional modules, a section for controlling the tempo, and a plurality of output circuits for outputting control data for each type of musical sound signal. The control data are used to control generation of a plurality of musical sound signals of different kinds, such as a melody sound signal, an accompaniment sound signal, and a rhythm sound signal.

In the following description, data, such as the above-described key data and musical-sound control data, which are generated or used in the apparatus main section 10 are referred to as "control data," so as to discriminate them from data used for management of data transfer. Further, solely the term "data" is used when both control data and data for management are to be included.

The interface section 20 includes a plurality of connection terminals 21; and interface memory 22 connected to the connection terminals 21. The connection terminals 21 are physical connection terminals to which the cables CBL are to be connected, and are distinguished from logical plugs (assumed virtual terminals), which will be described later. The plurality of connection terminals 21 are electrically connected together within the apparatus Mk. The interface memory 22 is constituted by, for example, RAM. The interface memory 22 temporarily stores data to be sent out via the connection terminals 21, and temporarily fetches and stores data which are being sent over the cables CBL connected to the connection terminals 21.

The communication control section 30 includes a plug correspondence memory 31, a management information memory 32, a connection setting control section 33, a transmission control section 34, and a reception control section 35.

Figure 3:
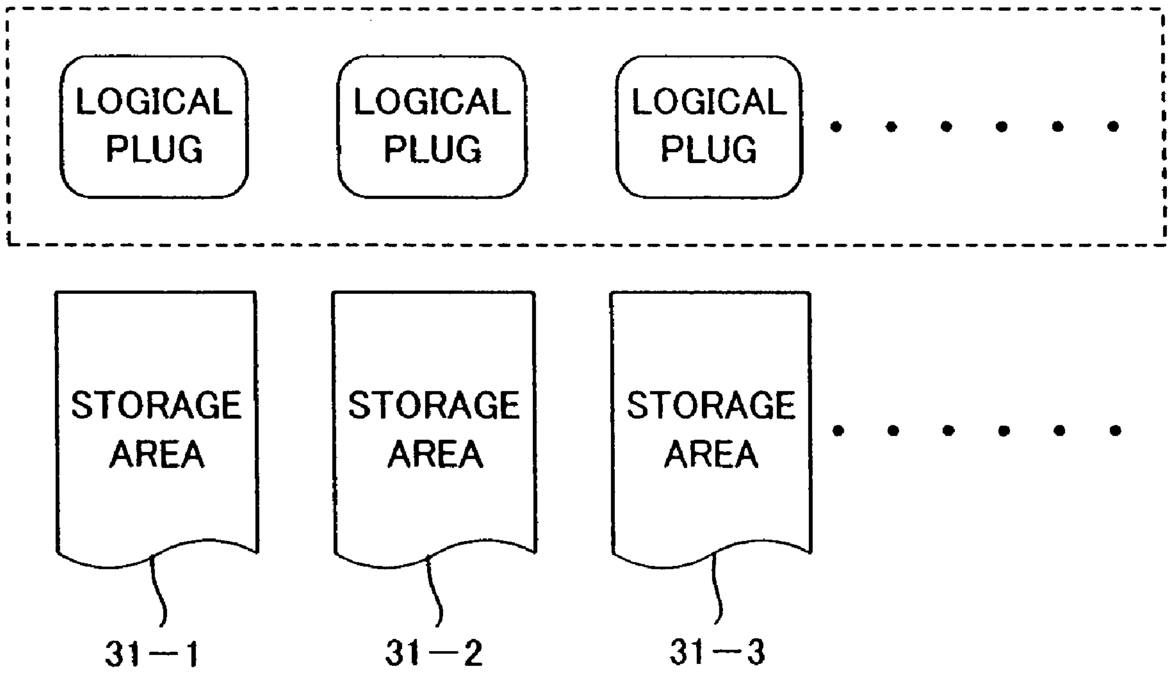
FIG. 3 shows a memory map provided in the plug correspondence memory of FIG. 2 and showing the correspondence between storage areas and logical plugs.

The plug correspondence memory 31 is constituted by, for example, RAM and, as shown in FIG. 3, includes a plurality of storage areas 31-1, 31-2, etc. corresponding to a plurality of logical plugs. Here, the term "logical plugs" used in the present specification is described. Logical plugs refer to virtual terminals (terminals that are not actually present) which are assumed for the above-described plurality of functional modules of the apparatus main section 10. The logical plugs include virtual input terminals for inputting control data to the functional modules to be used therein and virtual output terminals for outputting control data produced in the functional modules. Each of the storage areas 31-1, 31-2, etc. temporarily stores control data input through a corresponding virtual input terminal, as control data to be used in the corresponding functional module, as well as control data output from the functional module, as control data output from a corresponding virtual output terminal.

Figure 4A:
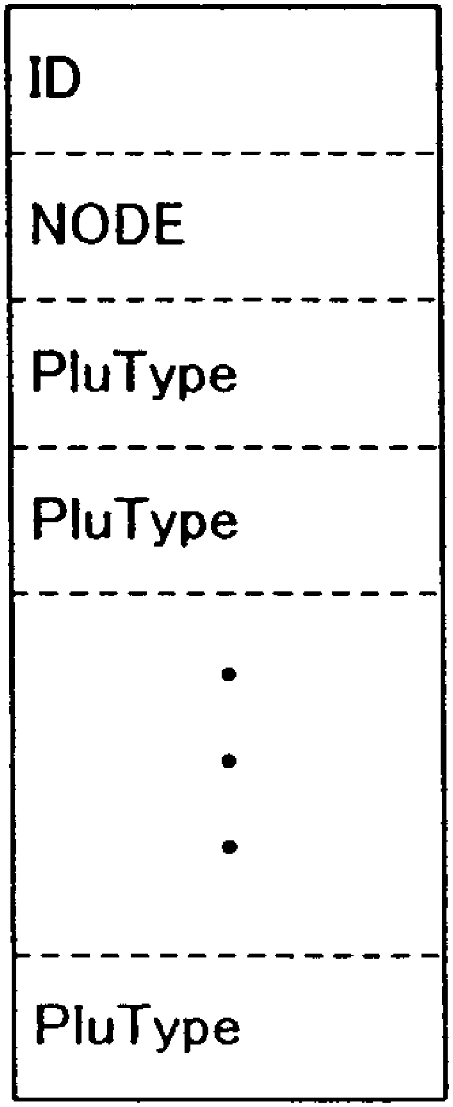
FIG. 4A is a memory map of a transmission information area of the management information memory of FIG. 2.
Figure 4B:
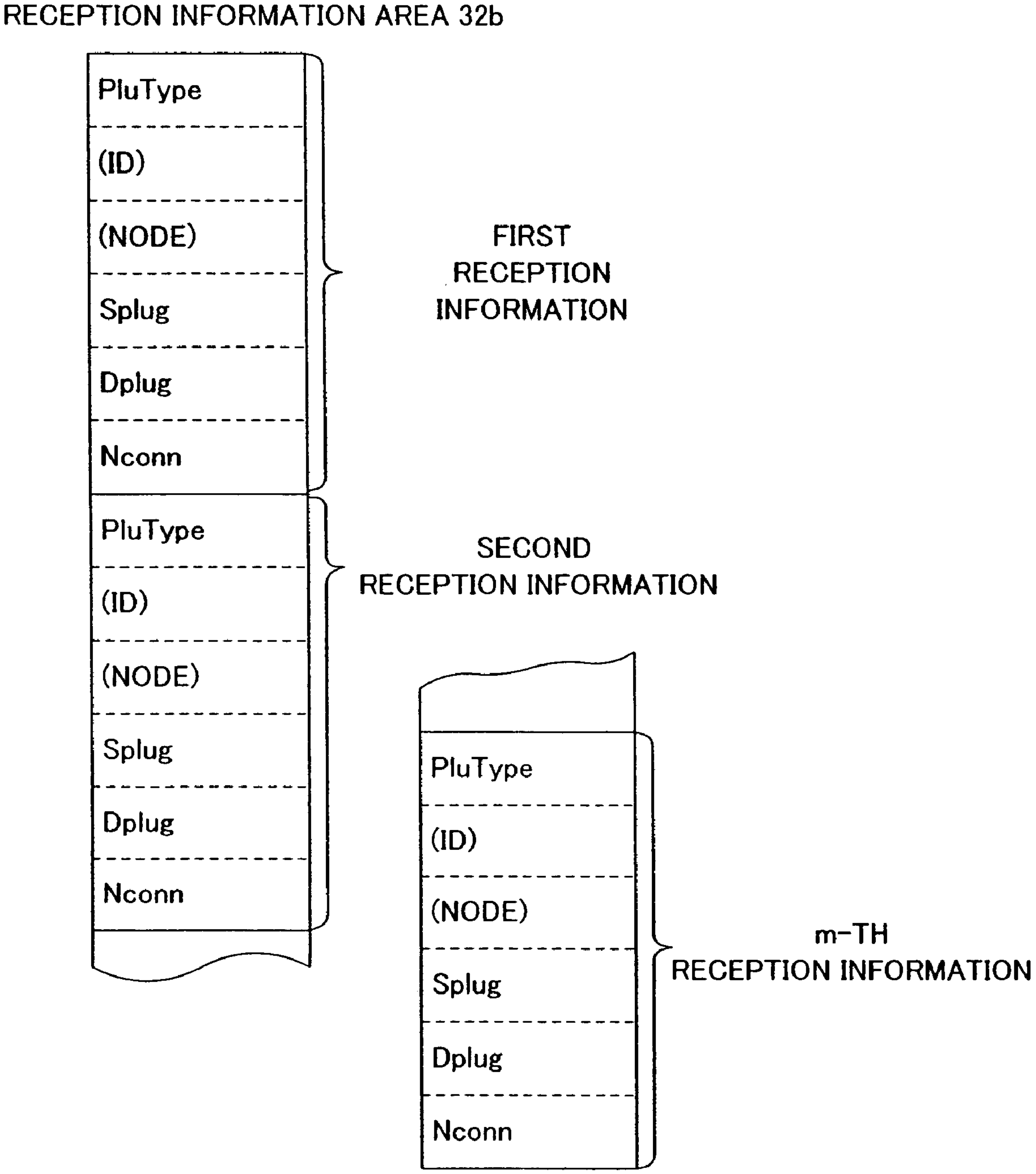
FIG. 4B is a memory map of a reception information area of the management information memory of FIG. 2.

The management information memory 32 is constituted by, for example, nonvolatile RAM and, as shown in FIGS. 4A and 4B, includes a transmission information area 32*a* and a reception information area 32*b*. In the transmission information area 32*a* are stored apparatus type data ID, node data NODE, and plug type data PluType. The apparatus type data ID and the node data NODE are provided for each apparatus. The apparatus type data ID provided for the apparatus Mk represent the type of the apparatus Mk itself (e.g., keyboard unit, sound source unit, or music sequencer). The node data NODE provided for the apparatus Mk represents the node number of the apparatus Mk itself (e.g., 1, 2, etc.) which is used to specify the apparatus Mk within the network. Therefore, whereas the same apparatus type data ID may be provided for two or more apparatuses in the network, unique node data NODE are provided for each apparatus. The plug type data PluType are provided for each of the functional modules of the apparatus main section 10 and represent a type of control data (e.g., key data, musical sound signal data, musical sound control data) output from the corresponding functional module or logical plug.

Generally, the apparatus type data ID and the plug type data PluType are already stored in the transmission information area 32*a* at the time of shipment of the apparatus Mk. However, the apparatus type data ID and the plug type data PluType can be overwritten at the time of construction of the network or thereafter. Generally, the node data are written in the transmission information area 32*a* at the time of construction of the network or at the time of the apparatus Mk being added to the network. However, the node data written in the transmission information area 32*a* may be overwritten thereafter.

In the reception information area 32*b* is stored one or a plurality of reception information sets, each consisting of plug type data PluType, apparatus type data ID, node data NODE, source plug data Splug, destination plug data Dplug, and connection number data Nconn. The plug type data PluType, the apparatus type data ID, and the node data NODE represent a type of control data, an apparatus type, and anode number, as described above. These data PluType, ID, and NODE are not necessarily contained in the reception information set. For example, only a portion of these data PluType, ID, and NODE (e.g., plug type data PluType only) may be contained in the reception information set, or it may be the case that none of these data PluType, ID, and NODE are contained in the reception information set.

The source plug data Splug, the destination plug data Dplug, and the connection number data Nconn represent the relation of connection between logical plugs of a transmission-side apparatus Mj and logical plugs of a reception-side apparatus Mk. The source plug data Splug specify one of the plurality of logical plugs of a transmission-side apparatus Mj. The destination plug data Dplug specify one logical plug of a reception-side apparatus Mk which is connected to the logical plug specified by the source plug data Splug. The connection number data Nconn represent the number of pairs of logical plugs to be connected to each other; i.e. the number of transmission-side logical plugs which are selected, in a predetermined sequence starting from the logical plug designated by the source plug data Splug, in order to be connected, respectively, to reception-side logical plugs which are selected in a predetermined sequence starting from the logical plug designated by the destination plug data Dplug. Notably, when the connection number data Nconn represent "0," the data are regarded to represent the maximum number of pairs for which connection can be established.

Figure 5:
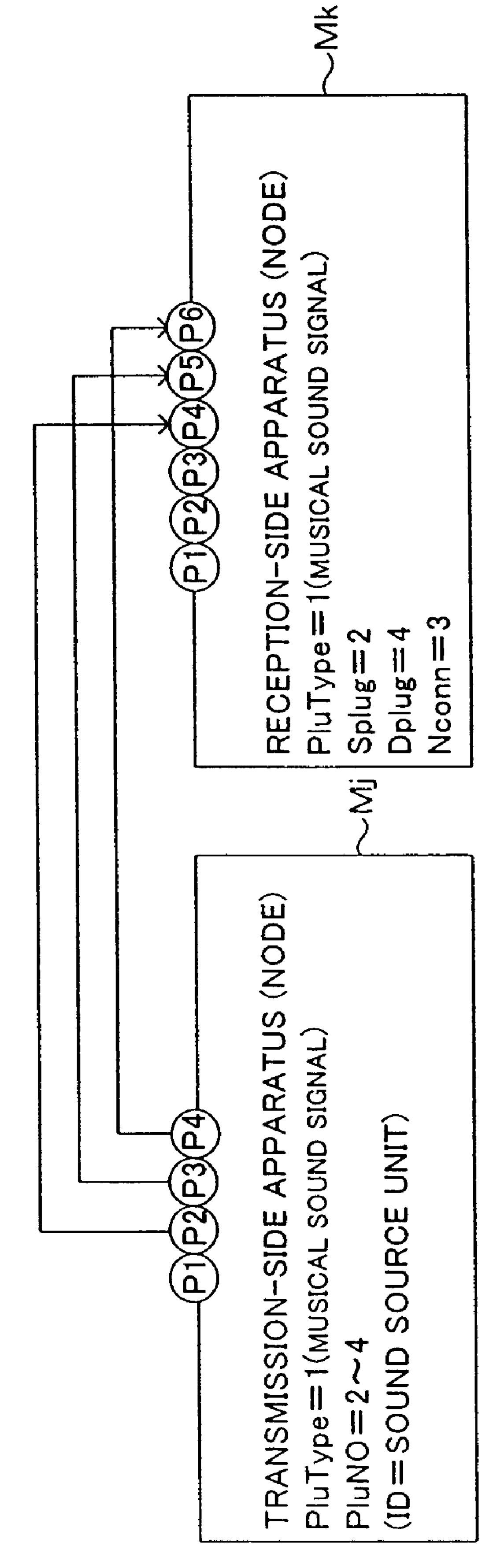
FIG. 5 is a connection diagram showing the correspondence between logical plugs of a transmission-side apparatus and logical plugs of a reception-side apparatus.

A more detailed description will be given by reference to an example of FIG. 5. First, correspondence between a plurality of logical plugs of the transmission-side apparatus Mj and a plurality of logical plugs of the reception-side apparatus Mk is defined. This correspondence definition may be performed so as to establish correspondence between all of the logical plugs of the transmission-side apparatus Mj and all or a portion of the logical plugs of the reception-side apparatus Mk. Alternatively, the correspondence definition may be performed so as to establish correspondence between a portion of the logical plugs of the transmission-side apparatus Mj and all or a portion of the logical plugs of the reception-side apparatus Mk. In the example of FIG. 5, correspondence between three logical plugs P2 to P4 of the transmission-side apparatus Mj and logical plugs P4 to P6 of the reception-side apparatus Mk is established.

Subsequently, identification data that represent one of the logical plugs P2 to P4 of the transmission-side apparatus Mj are used as the source plug data Splug. In this example, the value "2," which represents the second logical plug P2 of the transmission-side apparatus Mj, is used as the source plug data Splug. Further, identification data that represent one of the logical plugs P4 to P6 of the reception-side apparatus Mk are used as the destination plug data Dplug. In this example, the value "4," which represents the fourth logical plug P4 of the reception-side apparatus Mk, is used as the destination plug data Dplug.

Further, the connection number data Nconn are determined and serve as third identification data for specifying the plurality of logical plugs of the transmission-side apparatus Mj and the plurality of logical plugs of the reception-side apparatus Mk between which correspondence has been established. In the present example, the connection number data Nconn are determined to represent "3," because correspondence has been established between the three logical plugs P2 to P4 of the transmission-side apparatus Mj starting from the second logical plug, and the three logical plugs P4 to P6 of the reception-side apparatus Mk starting from the fourth logical plug.

Generally, the reception information set is written in the reception information area 32*b* at the time of construction of the network or at the time of the apparatus Mk being added to the network. However, the reception information set written in the reception information area 32*b* can be overwritten thereafter.

The connection setting control section 33 controls writing of the above-described various management information pieces into the transmission information area 32*a* and the reception information area 32*b* of the management information memory 32 and changing of the information pieces. The transmission control section 34 transmits to the outside the control data which are produced in the apparatus main section 10 and are stored in any of the plurality of storage areas 31-1, 31-2, etc. of the plug correspondence memory 31. Among various control data sets which are transmitted from other apparatuses to the cables CBL, the reception control section 35 fetches a control data set to be fetched therein and writes the control data set into any of the plurality of storage areas 31-1, 31-2, etc. of the plug correspondence memory 31. In actuality, the connection setting control section 33, the transmission control section 34, and the reception control section 35 are realized by means of program control of a microcomputer.

Further, the apparatus Mk includes an operation panel 40 provided with an operation switch group 41 and a display unit 42. The operation switch group 41 includes various operations switches used for setting or changing the above-described management information and for controlling operation of the apparatus main section 10. The display unit 42 is constituted by, for example, a liquid-crystal display and displays various data in relation to operation of the operation switch group 41.

Next, construction and operation of the above-described network will be described.

First, various types of musical apparatuses such as musical apparatuses M1 to M7 are prepared. One end of a cable CBL is connected to the connection terminal 21 of one apparatus, and the other end of the cable CBL is connected to the connection terminal 21 of another apparatus. In this manner, a plurality of apparatuses are mutually connected by means of cables CBL to thereby constitute a network as shown in FIG. 1. In this case, apparatus type data ID and plug type data PluType are written in the transmission information area 32*a* of the management information memory 32 in advance; i.e., at the time of shipment. However, when these data are to be changed, a user operates the operation switch group 41, while viewing the display unit 42, to thereby change the apparatus type data ID and the plug type data PluType.

Next, the user allots proper node numbers (in general, serial numbers starting from "1") to the apparatuses M1 to M7 connected to the network, and operates the operation switch group 41, while viewing the display unit 42, to thereby input the node numbers allotted to the apparatuses M1 to M7. Thus, input node numbers are written, as node data NODE, into the transmission information area 32*a* of the management information memory 32. The operation for writing various data into the transmission information area 32*a* and for changing the data is realized by program control corresponding to the connection setting control section 33.

Next, one reception information set consisting of plug type data PluType, apparatus type data ID, node data NODE, source plug data Splug, destination plug data Dplug, and connection number data Nconn is set. In this case as well, the user operates the operation switch group 41, while viewing the display unit 42, to thereby input the various data for each of the apparatuses M1 to M7. Among the data PluType, ID, NODE, Splug, Dplug, and Nconn, the source plug data Splug, the destination plug data Dplug, and the connection number data Nconn are essential.

The network can be operated even when none of the plug type data PluType, the apparatus type data ID, and the node data NODE are set. However, since the plug type data PluType represent the type of each control data set, the plug type data PluType are preferably set. However, the apparatus type data ID and the node data NODE may be set when only data from a specific apparatus or an apparatus of a specific type, among the apparatuses M1 to M7, are to be received. When none of the plug type data PluType, the apparatus type data ID, and the node data NODE are set, data are to be received from any of the apparatuses.

Figure 6:
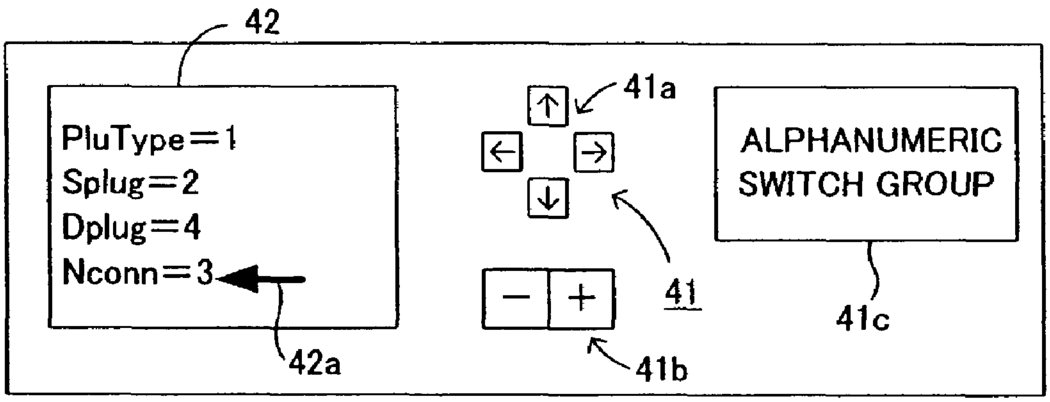
FIG. 6 is a schematic diagram of an operation panel used for explaining a method of inputting a set of reception information.

An example operation for data input will be described with reference to FIG. 6, which shows a portion of the operation switch group 41 and the display unit 42. The user causes the display unit 42 to display an input screen for reception information, through operation of cursor movement switches 41*a*, increment/decrement switches 41*b*, and an alphanumeric switch group 41*c*. Subsequently, the user moves the cursor 42*a* on the screen and inputs a single reception information set. The display screen of the display unit 42 of FIG. 6 shows an example in which "1" is input as the plug type data PluType (e.g., for representing that data to be input are musical sound signals); and "2," "4," and "3" are input as the source plug data Splug, the destination plug data Dplug, and the connection number data Nconn, respectively.

The thus-input data are written into the reception information area 32*b* of the management information memory 32 as a single reception information set. Notably, the operation for writing various data into the reception information area 32*b* is also realized by program control corresponding to the connection setting control section 33. The above-described writing of a single reception information set is repeated a required number of times, so that one or a plurality of reception information sets are stored in the reception information area 32*b*.

Through writing of various data into the transmission information area 32*a* and the reception information area 32*b*, the constitution of the network is completed. In the above description, the operation for writing various data into the apparatuses M1 to M7 and for changing the data is performed on an apparatus-by-apparatus basis. That is, the operation for writing various data into a certain apparatus is performed by the apparatus itself. However, the following method may be employed. Various data are input to a master apparatus (e.g., a personal computer) for data setting purpose or to any one of the apparatuses M1 to M7; and a different one of the apparatuses M1 to M7 is sequentially designated as a destination to which the input various data are to be transmitted, whereby the various data are transmitted to a designated one of the apparatuses M1 to M7 via the cable CBL and are written into the transmission information area 32*a* and the reception information area 32*b* of the designated apparatus.

Next, operation of the network and operations of the apparatuses M1 to M7 within the network will be described, on the basis of the assumption that, upon operation of the apparatus main section 10 in a certain apparatus Mj, control data to be transmitted to another apparatus Mk are produced. In this case, the produced data are written into a certain one of the plurality of storage areas 31-1, 31-2, etc. of the plug correspondence memory 31 of the apparatus Mj, the certain storage area being determined in accordance with a logical plug corresponding to the functional module which has produced the control data.

Figure 7:
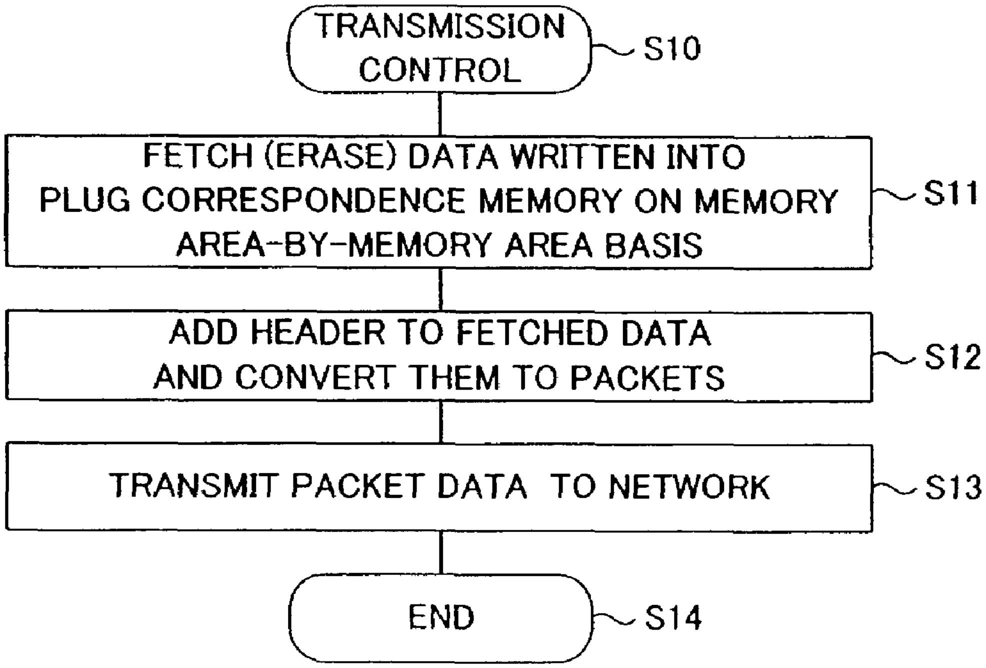
FIG. 7 is a flowchart of a transmission control program executed at the transmission control section of FIG. 2.

Meanwhile, the transmission control section 34 monitors the plug correspondence memory 31 at all times. When control data are written into any of the storage areas 31-1, 31-2, etc. of the memory 31, the transmission control section 34 executes the transmission control program shown in FIG. 7. The transmission control section 34 starts execution of this program in step S10, and in step S11 fetches control data from the plug correspondence memory 31 on a storage area-by-storage area basis. During the fetching of the control data, the transmission control section 34 produces plug number data PluNO, which represents an storage area in which the control data has been stored. Immediately after obtainment of the control data, the transmission control section 34 erases the control data in the plug correspondence memory 31 in order to enable the apparatus main section 10 to write new control data.

Figure 9:
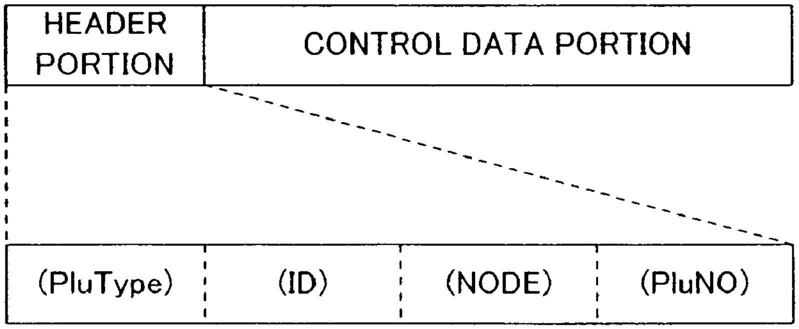
FIG. 9 is a diagram showing the format of transmission data in the form of a packet.

After completion of the processing in step S11, in step S12 the transmission control section 34 adds a header to data obtained from each storage area to thereby convert them to packet-form data (hereinafter referred to as "packet data"). As shown in FIG. 9, the packet consists of a header portion and a control data portion. The header portion includes plug number data PluNO, plug type data PluType, apparatus type data ID, and node data NODE. Among these data, the plug number data PluNO are essential. The plug number data PluNO correspond to a logical plug and are produced when control data are fetched from the plug correspondence memory 31.

The remaining data; i.e., plug type data PluType, apparatus type data ID, and node data NODE, are not necessarily added as a portion of the header portion. However, plug type data PluType, which represent the type of the control data, are desirably added. Since plug type data PluType are stored in the transmission information area 32*a* for each logical plug; i.e., for each of the storage areas 31-1, 31-2, etc. of the plug correspondence memory 31, the plug type data PluType are generated so as to correspond to the above-described plug number data PluNO.

When the reception-side apparatus Mk is required to receive only data from a specific transmission-side apparatus Mj of a specific apparatus type or a specific node, apparatus type data ID or node data NODE are preferably incorporated into the header portion. In this case, apparatus type data ID or node data NODE are previously stored in the transmission information area 32*a* for each logical plug; and during the processing in the above-described step S12, in addition to or in place of the above-described plug type data PluType, apparatus type data ID or node data NODE are incorporated into the header portion of a packet for each logical plug. Alternatively, the following method may be employed. For each logical plug, a flag indicating whether apparatus type data ID and node data NODE are to be incorporated into the header portion is stored in the transmission information area 32*a* in advance; and during the processing in the above-described step S12, apparatus type data ID and node data NODE are incorporated into the header portion of packet data for each logical plug in accordance with the status of a corresponding flag.

After completion of the processing in step S12, in step S13 the transmission control section 34 transmits the packet data to the interface memory 22 to thereby transmit the data via the interface memory 22 to the cable CBL connected to the connection terminal 21; i.e., to the network. In subsequent step S14, the transmission control section 34 ends the execution of the transmission control program. When the apparatus main section 10 produces new control data and writes them into any of the storage areas 31-1, 31-2, etc. of the plug correspondence memory 31, the above-described transmission control program is executed again, whereby the control data are converted to packet data, which are then transmitted onto the network. Since the cables CBL are mutually connected inside the apparatuses M1 to M7, transmission of data is controlled by an unillustrated controller in such a manner that different data are not present simultaneously within the network (i.e., on the cables).

Figure 8:
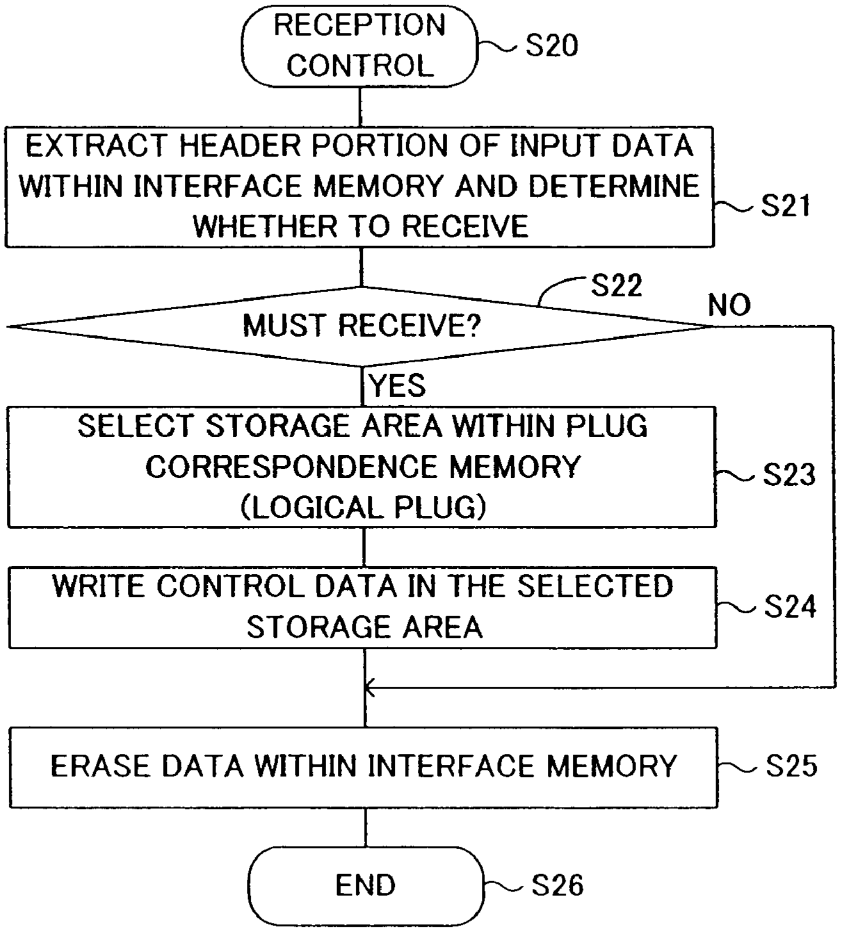
FIG. 8 is a flowchart of a reception control program executed at the reception control section of FIG. 2.

When the packet data are transmitted from the transmission-side apparatus Mj onto the network in the above-described manner, all the apparatus M1 to M7 of the network fetch the packet data into the interface memory 22. Upon this fetching, the reception control section 35 of each of the apparatus M1 to M7 starts execution of the reception control program shown in FIG. 8 in step S20 thereof. In step S21, the reception control section 35 converts the packet data to data of the original form, extracts the header portion, and determines as to whether the data are to be received, on the basis of data contained in the header portion; i.e., in accordance with the following first and second conditions.

The first condition is whether the identification data other than plug number data PluNO, such as plug type data PluType, apparatus type data ID, and node data NODE, which are contained in the header portion, match the identification data other than source plug data Splug, destination plug data Dplug, and connection number data Nconn, such as plug type data PluType, apparatus type data ID, and node data NODE, which are stored in the reception information area 32*b* of the management information memory 32; in other words, whether a reception information set containing the same identification data as those contained in the header portion is present in the reception information area 32*b* of the management information memory 32. When a reception information set satisfying this condition is present, the first condition is determined to be satisfied. Otherwise, the first condition is determined to be unsatisfied.

In the example case shown in FIGS. 5 and 6 in which only plug type data PluType (e.g., "1" representing a musical sound signal) are contained in the header portion as the identification data, the first condition is determined to be satisfied only when a reception information set which contains only plug type data PluType of the same value (e.g., "1" representing a musical sound signal) is present in the reception information area 32*b*. However, the first condition is determined to be satisfied when data other than source plug data Splug, destination plug data Dplug, and connection number data Nconn are stored in the reception information area 32*b*. Therefore, the first condition is not essential for reception of data.

The second condition is whether a plug number indicated by the plug number data PluNO contained in the header portion matches any of the plug numbers of the plurality of logical plugs of the transmission-side apparatus Mj specified by the source plug data Splug and the connection number data Nconn stored in the reception information area 32*b*; i.e., whether a reception information set whose plug number range covers the plug number indicated by the plug number data PluNO is present in the reception information area 32*b*. The plug number range of the reception information set starts from a plug number represented by the source plug data Splug and ends at a plug number obtained through a mathematical operation of adding to the plug number represented by the source plug data Splug a numerical value represented by the connection number data Nconn and then subtracting 1 therefrom. When a reception information set satisfying this condition is present, the second condition is determined to be satisfied. Otherwise, the second condition is determined to be unsatisfied.

That is, the second condition is determined to be satisfied only when the plug number indicated by the plug number data PluNO falls within the plug number range starting from the plug number represented by the source plug data Splug and ending at the plug number (Splug+Nconn−1) obtained through a mathematical operation of adding to the plug number represented by the source plug data Splug a numerical value represented by the connection number data Nconn and then subtracting "1" therefrom. In the example case shown in FIGS. 5 and 6 in which source plug data Splug represent a numerical value "2" and connection number data Nconn represent a numerical value "3", the second condition is determined to be satisfied when the plug number represented by the plug number data PluNO is "2", "3", or "4".

Upon determination in step S21 that the first and second conditions are both satisfied, in step S22 the reception control section 35 determines that the data are to be received (i.e., the result of the determination in step S22 becomes "YES"), and then proceeds to step S23. In step S23, the reception control section 35 selects one of the logical plugs; i.e., one of the storage areas 31-1, 31-2, etc. of the plug correspondence memory 31 of the reception-side apparatus Mk, on the basis of the plug number data PluNO, as well as on the basis of the source plug data Splug and the destination plug data Dplug contained in the reception information set having satisfied the above-described first and second conditions.

Specifically, the reception control section 35 determines a logical plug (i.e., a storage area) corresponding to a value Dplug+PluNO−Splug obtained through a mathematical operation of subtracting a value represented by the source plug data Splug from a value represented by the plug number data PluNO and then adding the resultant value to a value represented by the destination plug data Dplug. In the example case shown in FIGS. 5 and 6 in which source plug data Splug represent a numerical value "2" and destination plug data Dplug represent a numerical value "4", when the plug number data PluNO represent a numerical value "3", a logical plug P5 of the reception-side apparatus Mk is selected. Further, when the plug number data PluNO represent a numerical value "2", a logical plug P4 of the reception-side apparatus Mk is selected, and when the plug number data PluNO represent a numerical value "4," a logical plug P6 of the reception-side apparatus Mk is selected.

After completion of the processing in step S23, in step S24 the reception control section 35 transfers the control data stored in the interface memory 22 to a selected storage area (a storage area corresponding to the selected logical plug) among the storage areas 31-1, 31-2, etc. of the plug correspondence memory 31. In subsequent step S25, the reception control section 35 erases the control data stored in the interface memory 22 in order to enable fetching of data to be transmitted subsequently.

Upon determination in step S21 that the data are not to be received, in step S22, the reception control section 35 determines that the data are not to be received (i.e., the result of the determination in step S22 becomes "NO"), and then proceeds directly to step S25, without performance of the reception processing in steps S23 and S24. In step S25, the reception control section 35 erases the control data stored in the interface memory 22 as described above.

After completion of the processing in step S25, in step S26 the reception control section 35 ends the execution of the reception control program. When new data are transmitted within the network (onto the cables CBL), the transmitted data are fetched by a reception-side apparatus Mk through performance of the above-described reception control program. In the apparatus Mk having received the transmitted data, the apparatus main section 10 operates, while using the control data written into the plug correspondence memory 31, to thereby produce new data to be transmitted and write them into the plug correspondence memory 31 or to output the new data to an unillustrated output unit.

As described above, since the transmission control section 34 and the reception control section 35 execute the transmission control program and the reception control program, respectively, while using the management information stored in the management information memory 32, the amount of management information used for transmission of control data can be reduced. In particular, the plug number data PluNO representing a logical plug of the transmission-side apparatus Mj and the source plug data Splug and destination plug data Dplug stored in the management information memory 32 of the reception-side apparatus Mk are used so as to apply the relationship between the plug number data PluNO and the source plug data Splug to destination plug data Dplug, to thereby specify a destination-side logical plug. Therefore, information representing the relationship of connection between the logical plugs of the transmission-side apparatus Mj and the logical plugs of the reception-side apparatus Mk becomes simple.

Further, the determination as to whether control data are to be received is made on the basis of a determination as to whether the plug number data PluNO represents anyone of a plurality of logical plugs of the transmission-side apparatus Mj specified by the source plug data Splug and the connection number data Nconn stored in the management information memory 32 of the reception-side apparatus Mk. Therefore, the amount of information required for transfer of control data from the transmission-side apparatus Mj to the reception-side apparatus Mk can be reduced. In addition, the reception-side apparatus Mk can determine simply and properly whether control data are to be received. These features reduce the amount of data transferred over the cables CBL and the amount of data to be stored in the management information memory 32 of each apparatus.

Moreover, in the above-described transmission and reception of control data, in addition to the above-described plug number data PluNO, plug type data PluType, apparatus type data ID, and node data NODE are added to the header portion of the control data as identification data, and these identification data PluType, ID, and NODE are stored in the management information memory 32 of the reception-side apparatus Mk in order to enable specification of a reception-side apparatus Mk which is to receive the transmitted control data. Therefore, the determination as to whether control data are to be received can be executed simply and properly in the reception-side apparatus Mk.

Next, there will be described an operation for the case in which an apparatus (node NODE) within the network for which setting has been completed is replaced with another apparatus.

The user adds a new apparatus Mx to the network by connecting the new apparatus Mx to any of the apparatuses within the network by use of a cable CBL. In this case, it is assumed that apparatus type data ID, node data NODE, plug type data PluType, and other data have already been stored in the transmission information area 32*a* of the management information memory 32 of the new apparatus Mx by means of the above-described processing. When these data ID, NODE, and PluType have not yet been stored in the transmission information area 32*a*, the data ID, NODE, and PluType are written into the transmission information area 32*a* in the above-described manner.

Next, among the apparatuses M1 to M7 within the network, the user performs an operation of changing connections between apparatuses, while using an apparatus whose connection setting control section 33 has a function of controlling replacement of an apparatus. A specific apparatus, a portion of the apparatuses, or all the apparatuses may have the function of controlling replacement of apparatuses, to thereby enable the connection change operation. The connection change operation which is performed by use of a portion of an operation switch group 41 and a display 42 shown in FIGS. 13A and 13B will now be described in accordance with programs of FIGS. 10 to 12.

Figure 10:
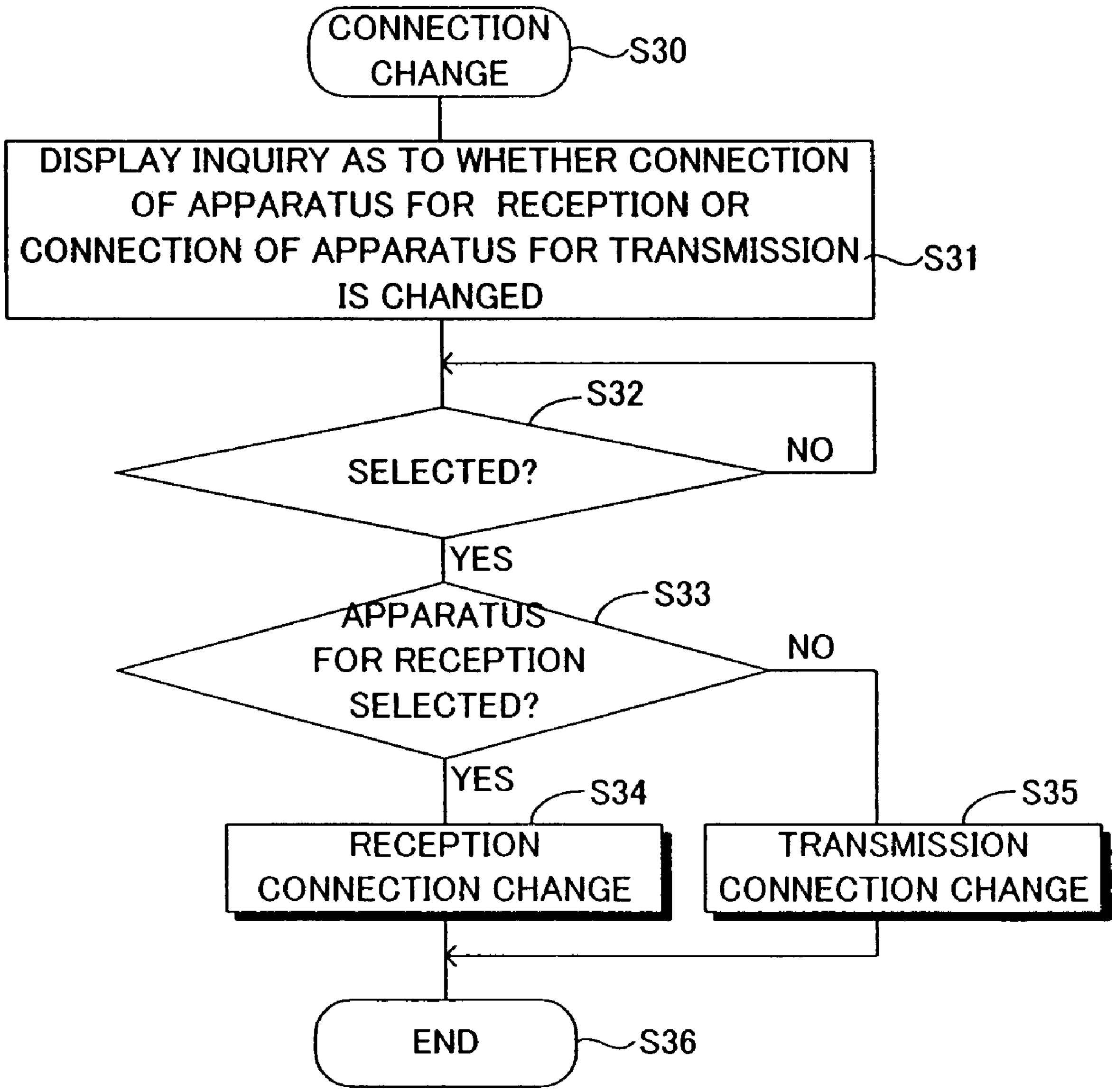
FIG. 10 is a flowchart of a connection change program executed at the connection setting control section of FIG. 2.

When the user operates a connection change switch 41*d* contained in the operation switch group 41 at a specific apparatus having the above-described connection change function (hereinafter, this specific apparatus will be referred to as an "apparatus for connection change"), the connection setting control section 33 of the apparatus for connection change starts execution of a connection control program shown in FIG. 10 in step S30 thereof. After the program has been started, in step S31 the connection setting control section 33 displays on the display unit 42 a message for inquiring whether there is to be performed a connection change operation for an apparatus for reception or a connection change operation for an apparatus for transmission, and in step 32 waits until the user completes selection operation. When the user has, by use of, for example, the cursor movement switch 41*a*, selected the connection change operation for an apparatus for reception or the connection change operation for an apparatus for transmission, the result of the determination in step S32 becomes "YES." In this case, in step S33, the connection setting control section 33 determines whether the user has selected the connection change operation for an apparatus for reception or the connection change operation for an apparatus for transmission. When the user has selected the connection change operation for an apparatus for reception, the result of the determination in step S33 becomes "YES." In this case, in step S34 the connection setting control section 33 performs a reception connection change routine, and then in step S36 ends the connection change program. When the user has selected the connection change operation for an apparatus for transmission, the result of the determination in step S33 becomes "NO." In this case, in step S35 the connection setting control section 33 performs a transmission connection change routine, and then in step S36 ends the connection change program.

Figure 11:
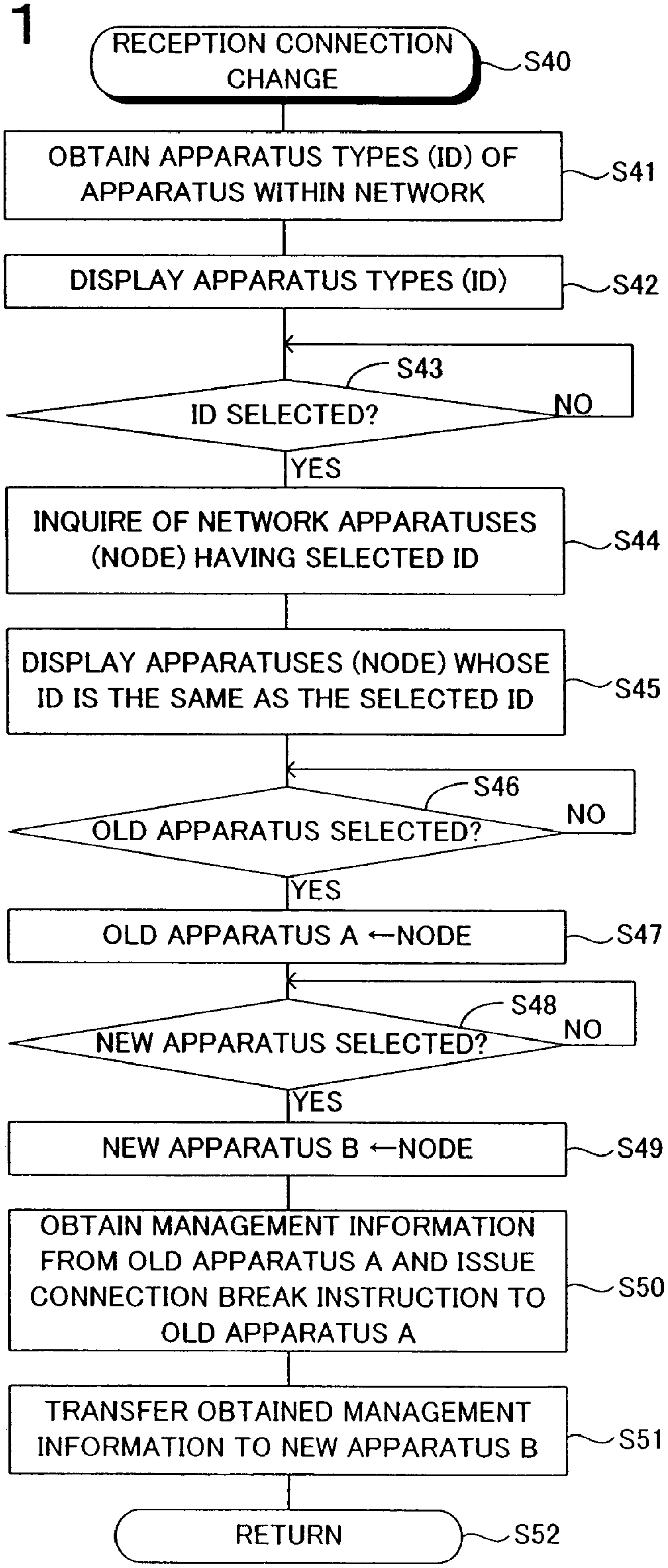
FIG. 11 is a flowchart showing the details of the reception connection change routine of FIG. 10.
Figure 12:
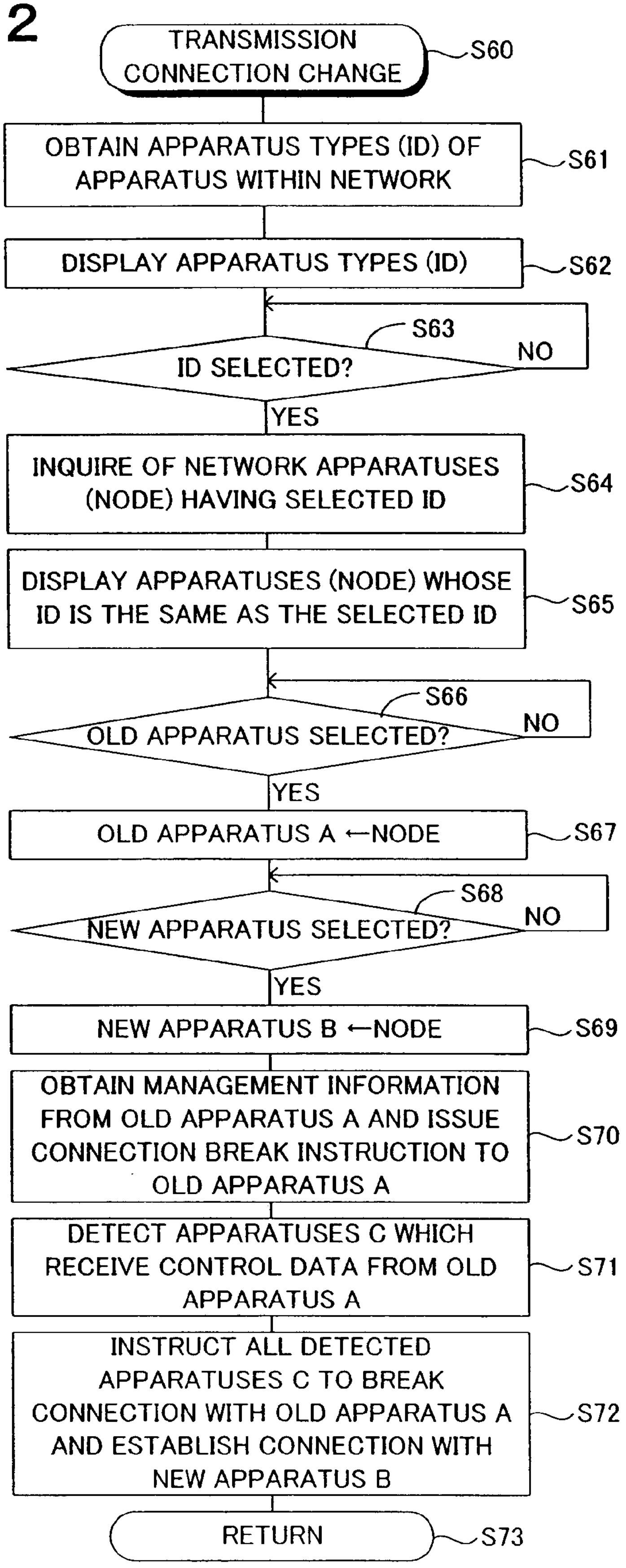
FIG. 12 is a flowchart showing the details of the transmission connection change routine of FIG. 10.
Figure 13A:
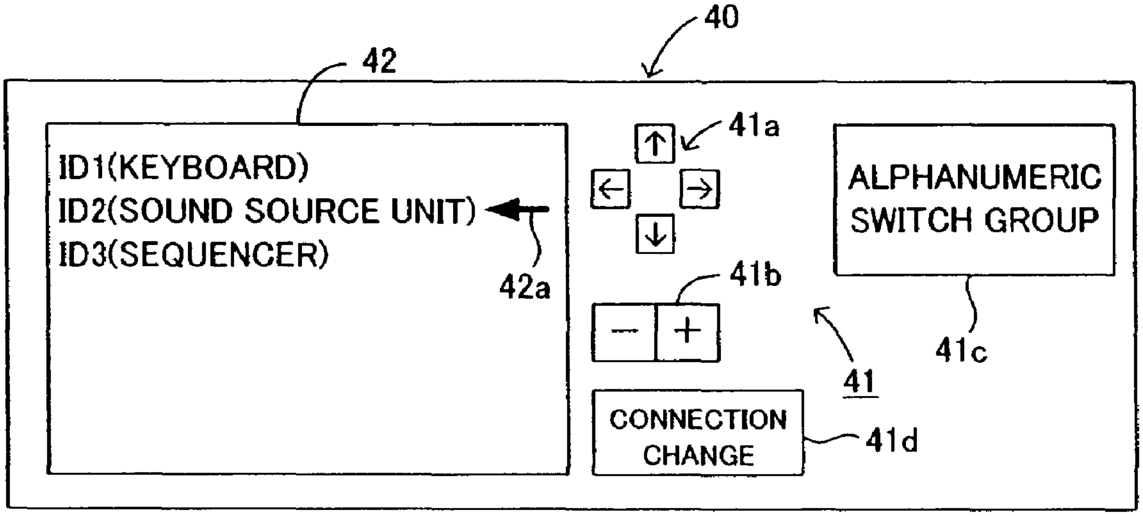
FIG. 13A is a schematic diagram of an operation panel used for explaining an operation of selecting an apparatus type within the network.

The connection setting control section 33 starts the execution of the reception connection change routine in step S40 of FIG. 11. In step S41, the connection setting control section 33 instructs all the apparatuses within the network to transmit apparatus type data ID to thereby obtain information regarding the types of the apparatuses built in the network. In response thereto, each of the apparatuses M1 to M7 and Mx within the network transmits the apparatus type data ID stored in the transmission information area 32*a* of the management information memory 32 to the apparatus for connection change via the network (the cables CBL), by means of unillustrated program control. By means of the processing in step S41, the connection setting control section 33 of the apparatus for connection change fetches via the interface memory 22 a plurality of sets of apparatus type data ID which have been transmitted from the apparatuses M1 to M7 and Mx. In subsequent step S42, the connection setting control section 33 displays the fetched sets of apparatus type data ID on the display unit 42, as shown in FIG. 13A. In subsequent step S43, the connection setting control section 33 waits until the user selects one of the sets of apparatus type data ID. Thus, all the apparatus types existing within the network are displayed on the display unit 42.

Figure 13B:
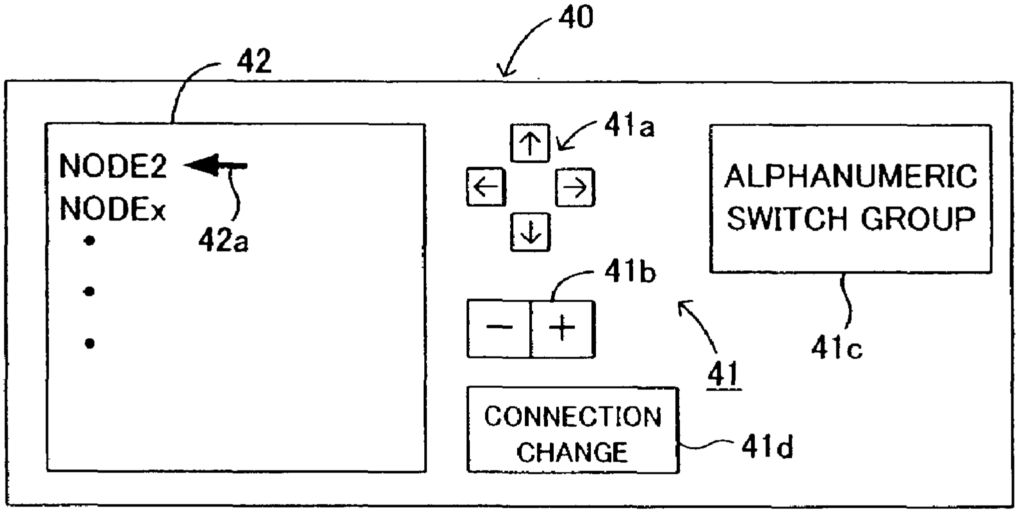
FIG. 13B is a schematic diagram of the operation panel used for explaining an operation of selecting an apparatus within the network.

When the user has selected one of the displayed apparatus types by use of, for example, the cursor movement switch 41*a*, the result of the determination in step S43 becomes "YES," and therefore, the connection setting control section 33 proceeds to step S44. In step S44, the connection setting control section 33 inquires of each apparatus within the network whether the apparatus type of the apparatus matches the selected apparatus type data ID, and instructs apparatuses whose apparatus types have been found to match the selected apparatus type to send their node data NODE. In response thereto, each of the apparatuses whose apparatus types have been found to match the selected apparatus type transmits the node data NODE stored in the transmission information area 32*a* of the management information memory 32 to the apparatus for connection change via the network (the cables CBL), by means of unillustrated program control. In the apparatus for connection change, by means of processing in step S44, the connection setting control section 33 fetches via the interface memory 22 the node data NODE transmitted from the apparatuses whose apparatus types have been found to match the selected apparatus type. In subsequent step S45, the connection setting control section 33 displays all the fetched sets of node data NODE on the display unit 42, as shown in FIG. 13B, as well as a message for requesting the user to select an apparatus to be changed (hereinafter may be referred to as an "old apparatus"), and an apparatus which is to replace it (hereinafter may be referred to as a "new apparatus"). In subsequent step S46, the connection setting control section 33 waits until the user selects a set of node data NODE. FIG. 13B shows the case in which the apparatus types of the apparatuses M2, Mx, etc. have been found to match the selected apparatus type. Thus, all the apparatuses (node data NODE) which are present within the network and whose apparatus types have been found to match the apparatus type selected by the user are displayed on the display unit 42.

When the user has selected one of the displayed apparatuses (sets of node data NODE) as an old apparatus, the result of the determination in step S46 becomes "YES," and therefore, the connection setting control section 33 proceeds to step S47. In step S47, the connection setting control section 33 stores the selected node data NODE as an old apparatus A. Subsequently, when the user has selected one of the displayed apparatuses (sets of node data NODE) as a new apparatus, the result of a determination in step S48 becomes "YES," and therefore, the connection setting control section 33 proceeds to step S49. In step S49, the connection setting control section 33 stores the selected node data NODE as a new apparatus B.

In place of the above-described method, any of various methods may be used for designating the old apparatus A and the new apparatus B. For example, instead of performing the processing in steps S41 to S43, the connection setting control section 33 may request the user to directly input on the operation panel 40 apparatus type data ID of an apparatus to be replaced, after which the connection setting control section 33 performs the processing in steps S44 to S49 while using the thus-input apparatus type data ID, to thereby enable the user to designate the old apparatus A and the new apparatus B. Moreover, instead of performing the processing in steps S41 to S49, the connection setting control section 33 may request the user to directly input the old apparatus A and the new apparatus B on the operation panel 40.

After completion of the processing in step S49, in step S50 the connection setting control section 33 instructs the old apparatus A to send all the reception information sets stored in the reception information area 32*b* of the management information memory 32. In response thereto, the old apparatus A transmits the reception information sets to the apparatus for connection change, by means of unillustrated program control. In the apparatus for connection change, by means of processing in step S50, the connection setting control section 33 fetches via the interface memory 22 the reception information sets transmitted from the old apparatus A. In step S50, the connection setting control section 33 instructs the old apparatus A to break the connection with the network. The old apparatus A fetches and stores the connection break instruction by means of unillustrated program control, to thereby stop fetching of control data transmitted onto the network (cables CBL).

After completion of the processing in step S50, in step S51 the connection setting control section 33 of the apparatus for connection change transmits to the new apparatus B all the reception information sets received from the old apparatus A. The new apparatus B receives the transmitted reception information sets. In response thereto, the connection setting control section 33 of the new apparatus B writes the received reception information sets into the reception information area 32*b* of the management information memory 32, by means of unillustrated program control. Thus, the new apparatus B starts the operation of receiving data from the apparatuses of the network in accordance with the reception information sets stored into the reception information area 32*b* and writing them into the plug correspondence memory 31. In subsequent step S52, the execution of the reception connection change routine is ended.

From this point in time, the old apparatus A does not receive data transmitted from other apparatuses; and instead, the new apparatus B receives data which would have been received by the old apparatus A. In this case, the old apparatus A may be physically disconnected from the network.

By virtue of the above-described reception connection change routine, setting for changing a reception apparatus from the old apparatus A to the new apparatus B can be performed simply. As a result, the operation accompanying the replacement of apparatuses for reception connected to the network can be simplified.

Next, there will be described the case in which the user has selected the connection change operation for an apparatus for transmission. In this case, the connection setting control section 33 of the apparatus for connection change performs the transmission connection change routine in step S35, as described above. The connection setting control section 33 starts the execution of the transmission connection change routine in step S60 of FIG. 12. Through the processing in steps S61 to S69, which is similar to that in steps S41 to S49 of the reception connection change routine shown FIG. 11, an apparatus (node NODE) selected by the user as an apparatus to be replaced and an apparatus (node NODE) selected by the user as an apparatus for replacing it are set as an old apparatus A and a new apparatus B, respectively. As in the case of the reception connection change routine, instead of using the processing in steps S61 to 69, any of various methods may be used so as to designate the old apparatus A and the new apparatus B.

After completion of the processing in steps S61 to S69, in step S70 the connection setting control section 33 instructs the old apparatus A to send apparatus type data ID, node data NODE, plug type data PluType, and other data stored in the transmission information area 32*a* of the management information memory 32; i.e., data such as ID, NODE, and PluType which are used in reception by other apparatuses. By means of unillustrated program control, the connection setting control section 33 of the old apparatus A reads the apparatus type data ID, node data NODE, plug type data PluType, and other data stored in the transmission information area 32*a* and transmits them to the apparatus for connection change. In response thereto, through processing in step S70, the connection setting control section 33 of the apparatus for connection change fetches the transmitted apparatus type data ID, node data NODE, plug type data PluType, and other data.

Subsequently, in step S70, the connection setting control section 33 of the apparatus for connection change instructs the old apparatus A to break the connection with the network. The old apparatus A fetches and stores the connection break instruction by means of unillustrated program control, to thereby stop sending of control data transmitted onto the network (cables CBL).

In subsequent step S71, the connection setting control section 33 of the apparatus for connection change detects all apparatuses having been set to receive data from the old apparatus A. During this detection operation, the connection setting control section 33 transmits the above-described apparatus type data ID, node data NODE, plug type data PluType, and other data to the remaining apparatuses (excepting the old apparatus A) and inquires of the other apparatuses whether the data ID, NODE, and PluType are stored in the reception information area 32*b* of the management information memory 32 as a portion of the reception information sets; i.e., whether the remaining apparatuses have been set to receive control data which have, in the header portion, the apparatus type data ID, node data NODE, plug type data PluType, and other data. In each of the remaining apparatuses, through execution of an unillustrated program, the connection setting control section 33 receives the transmitted apparatus type data ID, node data NODE, plug type data PluType, and other data, and transmits to the apparatus for connection change a reply to the above-described inquiry with reference to the reception information sets stored in the reception information area 32*b* of the corresponding management information memory 32. This inquiry enables the apparatus for connection change to detect all apparatuses C within the network which receive control data from the old apparatus A.

After completion of the processing in step S71, in step S72 the connection setting control section 33 of the apparatus for connection change causes all the detected apparatuses C to receive data transmitted from the new apparatus B in place of data transmitted from the old apparatus A. That is, the connection setting control section 33 instructs all the detected apparatuses C to break the connection with the old apparatus A and establish a connection with the new apparatus B. In this case, the connection setting control section 33 of the apparatus for connection change obtains the apparatus type data ID, node data NODE, plug type data PluType, and other data stored in the transmission information area 32*a* of the management information memory 32 of the new apparatus B and transmits them to all the apparatuses C.

In each of the apparatuses C, through execution of an unillustrated program, the connection setting control section 33 receives the transmitted apparatus type data ID, node data NODE, and plug type data PluType. When the reception information sets stored in the reception information area 32*b* of the management information memory 32 contain an item which is peculiar to the new apparatus B (i.e., is different from any item for the old apparatus A), the connection setting control section 33 replaces the apparatus type data ID, node data NODE, plug type data PluType, and other data stored in the reception information area 32*b* with the received apparatus type data ID, node data NODE, and plug type data PluType. For example, when node data NODE are present, the node data NODE are overwritten without fail. By virtue of the above-described operation, the apparatus C starts the operation of receiving control data transmitted from the new apparatus B in place of data transmitted from the old apparatus A through the above-described reception processing and writing them into the plug correspondence memory 31. In subsequent step S73, the execution of the transmission connection change routine is ended.

From this point in time, the old apparatus A does not transmit control data, and instead the new apparatus B transmits control data to the apparatuses within the network. In this case, the old apparatus A may be physically disconnected from the network.

By virtue of the above-described transmission connection change routine, setting for changing a reception apparatus from the old apparatus A to the new apparatus B can be performed simply, even when the number of apparatuses C which receive control data transmitted from the old apparatus A is large. As a result, the operation accompanying the replacement of apparatuses for transmission connected to the network can be simplified.

The old apparatus A mentioned in relation to change of connection of an apparatus for reception is described as being of a reception dedicated type, and the apparatus A mentioned in relation to change of connection of an apparatus for transmission is described as being of a transmission dedicated type. However, the above-described connection change can be applied to an apparatus which has both a reception function and a transmission function. When both the reception and transmission functions of the old apparatus A are to be replaced by other apparatus(es), the above-described reception connection change processing and transmission connection change processing are individually applied to the reception and transmission functions of the old apparatus A. Further, when only one of the reception and transmission functions of the old apparatus A is to be replaced by other apparatus(es), the above-described reception connection change processing or transmission connection change processing is selectively applied to the old apparatus A. Notably, in this case, the old apparatus A is maintained connected to the network.

In the above-described embodiment, the apparatuses M1 to M7 and Mx are provided in the network. However, the number of apparatuses provided in the network may be selected freely. Further, the types of apparatuses are not limited to those described in the above-described embodiment, and apparatuses of types other than those described in the above-described embodiment may be provided in the network. In particular, the present invention is not limited to musical apparatuses and can be applied to a network to which various apparatuses used in any other field are connected.

The present invention is not limited to the above-described embodiment, and the embodiment may be changed or modified without departing from the spirit of the present invention.

What is claimed is:

1. An management apparatus for managing data traffic over a network, said apparatus operatively coupled to a plurality of other apparatuses over a network, wherein each of said plurality of other apparatuses includes a plurality of functioning modules and a storage medium containing node data that identify the apparatus and reception information including connection data, said connection data of each apparatus identifying a connection between one of the functioning modules of each apparatus itself and one of the functioning modules of another one of said plurality of other apparatuses, wherein each of said plurality of other apparatuses selectively receives packet data transmitted over the network based on the respectively stored reception information, said management apparatus comprising:

a display; and a controller, wherein the controller is programmed to perform the steps of:

fetching node data from at least two of said plurality of other apparatuses;

displaying the fetched node data on said display;

in response to user instructions, selecting two of the displayed fetched node data, selecting a first and a second apparatus specified by the respective fetched node data;

instructing the first apparatus to transmit, to the management apparatus, the reception information stored in said first apparatus;

receiving the transmitted reception information from said first apparatus; and transmitting to the second apparatus the received reception information.

2. The management apparatus of claim 1, wherein said controller is further programmed to perform the steps of:

displaying, on said display, apparatus type data for each of the apparatus corresponding to the node data displayed on said display, said apparatus type data specifying a type of the corresponding apparatus;

in response to user instruction, selecting one of the displayed apparatus type data;

determining which of the said plurality of other apparatus is the type of apparatus that match the selected apparatus type data; and instructing the matched apparatus having the same type as the apparatus type data to send, to the management apparatus, the respective node data.

3. The management apparatus of claim 1, wherein said controller is further programmed to perform the step of instructing the first apparatus to terminate connection with the network.

4. The management apparatus of claim 1, wherein said connection data of each of said plurality of other apparatuses further includes source-plug data, destination-plug data, and connection-number data, wherein said source-plug data of each of said plurality of other apparatuses designates one of the plurality of functional modules included in another one of said plurality of other apparatuses, wherein said destination-plug data of each of said plurality of other apparatuses designates one of the plurality of functional modules included in the apparatus itself, and wherein said connection number data of each of said plurality of other apparatuses represents the number of pairs of functional modules to be connected between the apparatus itself and said another connected apparatus.

5. The management apparatus of claim 1, wherein the packet data include node data provided for the apparatus that transmits the packet data.

6. A management apparatus amongst a plurality of apparatuses that are operatively coupled over a network, wherein each of the apparatuses includes a plurality of functioning modules and a storage medium containing data sets comprising node data that specify a node number of the apparatus, wherein the storage medium of certain ones of each of the apparatuses further contains reception information data sets that designate a source from which data packets are to be received, wherein each apparatus produces packet data by using the stored data sets and outputs the produced data sets to the network, said management apparatus comprising:

a display; and a controller, said controller programmed to perform the steps of:

fetching node data from at least two of said plurality of apparatuses;

displaying the fetched node data on the display;

in response to user instructions, selecting a first and a second apparatus specified by the respectively displayed node data;

instructing the first apparatus to transmit data set stored in the first apparatus;

receiving from the first apparatus the transmitted data set;

identifying, from amongst said plurality of apparatuses, apparatuses containing a storage medium having reception information data sets that designate the first apparatus as a source from which data packets are to be received;

instructing all identified apparatus to terminate connection with the first apparatus, and establish a new connection with the second apparatus.

7. The management apparatus of claim 6, wherein said controller is further programmed to perform the steps of:

displaying, on said display, apparatus type data for each of the apparatus corresponding to the node data displayed on said display, said apparatus type data specifying a type of the corresponding apparatus;

in response to user instruction, selecting one of the displayed apparatus type data;

determining which of the said plurality of other apparatus is the type of apparatus that match the selected apparatus type data; and instructing the matched apparatus having the same type as the apparatus type data to send, to the management apparatus, the respective node data.

8. The management apparatus of claim 6, wherein said controller is further programmed to perform the step of instructing the first apparatus to terminate connections with the network.

9. The management apparatus of claim 6, wherein said packet data include node data of the transmitting apparatus.

* * * * *